3,260,746
BIS-(N-ACETYLHYDRAZINO-N'-CARBONYL-
METHYL)DISULPHIDE
Wallace Broadbent, Francis Leslie Rose, and Arthur Leonard Walpole, all of Macclesfield, England, assignors to Imperial Chemical Industries Limited, Millbank, London, England, a corporation of Great Britain
No Drawing. Filed July 23, 1962, Ser. No. 211,849
Claims priority, application Great Britain, Aug. 1, 1961, 27,871/61
1 Claim. (Cl. 260—561)

This invention relates to hydrazine derivatives and more particularly it relates to dithiodiglycollic dihydrazide derivatives which possess valuable therapeutic properties. They are useful, for example, in the treatment of inflammatory conditions, for example rheumatoid arthritis in man, and they are effective in protecting man against the undesirable effects of X-rays and chemical reagents such as the nitrogen mustard derivatives which simulate the biological effects of X-rays.

In United Kingdom patent specification No. 782,420 there are described and claimed inter alia certain dihydrazides of the formula:

$$(SCH_2CO \cdot NR_1 \cdot NR_2R_3)_2$$

where $R_1$ and $R_2$ stand for hydrogen or for alkyl radicals and $R_3$ stands for hydrogen or for an alkyl radical, or for the group —$COCH_3$. The only compound falling within this generic formula which is disclosed in the specification is dithiodiglycolic dihydrazide.

We have now prepared a particular novel acyl derivative of dithiodiglycollic dihydrazide and found, for example, that diacetyl dithiodiglycollic dihydrazide [bis(N-acetylhydrazino-N'-carbonylmethyl)disulphide], of the formula stated above wherein $R_1$ and $R_2$ stand for hydrogen and $R_3$ stands for the group —$COCH_3$, possesses therapeutic properties similar to those mentioned above but it is superior to the parent compound in that it is less toxic, and it is more stable in aqueous media thereby allowing the preparation of more concentrated aqueous pharmaceutical compositions to be used for therapeutic purposes.

According to the invention therefore we provide a new dithiodiglycollic dihydrazide derivative which is bis-N-acetylhydrazino - N' - carbonylmethyl)disulphide of the formula:

$$(SCH_2CONHNHCOCH_3)_2$$

According to a further feature of the invention we provide a process for the manufacture of the said dithiodiglycollic dihydrazide derivative which comprises acetylation of dithiodiglycollic dihydrazide.

The said acetylation process may be carried out by reaction of dithiodiglycollic dihydrazide with an acetylating agent which may be acetic acid, or an acetyl halide, for example acetyl chloride or acetyl bromide, or acetic anhydride. The reaction is preferably carried out in the presence of a diluent or solvent, for example a lower aliphatic acid such as acetic acid, an alcohol such as methanol or ethanol, a tertiary base such as pyridine or an ether such as dioxane, and it may be accelerated or completed by the action of heat.

As stated above, the compound with which this invention is concerned possesses valuable therapeutic properties, and thus a further feature of this invention is the provision of pharmaceutical compositions containing the said dithiodiglycollic dihydrazide derivative as active ingredient in the presence of a non-toxic pharmaceutically-acceptable diluent or carrier.

The said compositions may be in a form suitable for oral administration or for parenteral administration. They may be, for example, tablets and capsules for oral use, or sterile injectable preparations in aqueous media, for example sterile aqueous solutions, for parenteral use. The said compositions may be in unit dosage forms containing 50, 100, 250 or 500 mg. of active ingredient.

According to a further feature of the invention we provide a process for the treatment of radiation sickness or for the protection of the body against the undesirable effects of X-rays and chemical reagents such as the nitrogen mustard derivatives which simulate the biological effects of X-rays which comprises administering an effective amount of bis(N-acetylhydrazino-N'-carbonylmethyl)disulphide by oral or parenteral means.

The invention is illustrated but not limited by the following examples in which the parts are by weight:

*Example 1*

38.4 parts of dithiodiglycollic dihydrazide are dissolved in 147 parts of glacial acetic acid, and a mixture of 65 parts of acetic anhydride and 63 parts of glacial acetic acid is slowly added with stirring, keeping the temperature at 15–20° C. After 30 minutes, 243 parts of ethyl acetate are added. After a further 30 minutes, the suspension is filtered, and the solid residue is washed with ethyl acetate and dried at room temperature. There is thus obtained bis(N-acetylhydrazino-N'-carbonylmethyl)-disulphide, M.P. 196–198° C.

The material so obtained is freely soluble in water and the solutions so obtained can be sterilised by filtration or heat. The soluble form of the hydrazide is converted into an isomorphous sparingly-soluble form, for example by heating above its melting point in a neutral solvent such as nitrobenzene, or at lower temperatures in a basic solvent such as boiling pyridine. The sparingly soluble form can be re-converted into the soluble modification by heating, for example in a solvent such as glacial acetic acid or water.

*Example 2*

The process described in Example 1 is repeated except that the 65 parts of acetic anhydride and 63 parts of glacial acetic acid are replaced by a mixture of 50 parts of acetyl chloride and 80 parts of pyridine. There is likewise obtained bis(N-acetylhydrazino-N'-carbonylmethyl)disulphide, M.P. 196–198° C.

*Example 3*

26 parts of dithiodiglycollic dihydrazide are heated under reflux for 55 minutes with 90 parts of glacial acetic acid. The reaction mixture is then cooled, 90 parts of ethyl acetate are added and the mixture is filtered. There is thus obtained bis(N-acetylhydrazino-N'-carbonylmethyl)disulphide, M.P. 193° C., containing traces of an impurity which is insoluble in water.

*Example 4*

The process described in Example 1 is repeated using as reactants 38.4 parts of dithiodiglycollic dihydrazide in 147 parts of dioxane and a mixture of 50 parts of acetyl chloride and 80 parts of pyridine. There is likewise obtained bis(N-acetylhydrazino-N'-carbonylmethyl)disulphide, M.P. 196–198° C.

*Example 5*

In a control series of untreated mice, the median lethal dose of X-irradiation was found to be of the order of 650 r. In mice pretreated, 10 minutes before irradiation, with a single intraperitoneal injection of 30 mg. (per mouse) of bis(N-acetylhydrazino-N'-carbonylmethyl) disulphide in aqueous solution, the median lethal dose was increased to about 900 r. thus indicating that the treated mice were appreciably protected against X-irradiation.

Example 6

In a control series of untreated mice, the median lethal dose of "nitrogen mustard" (bis-β-chloroethylmethylamine hydrochloride), given in a single intraperitoneal injection, was found to be 3–4 mg. per kg. body weight. In mice pretreated, 15 minutes before the injection of the said "nitrogen mustard" with a single intravenous injection of 40 mg. (per mouse) of bis(N-acetylhydrazino-N'-carbonylmethyl)disulphide in aqueous solution, the median lethal dose of the former was increased to about 24 mg. per kg. body weight thus indicating that the treated mice were appreciably protected against "nitrogen mustard."

Example 7

250 parts of bis(N - acetylhydrazino - N' - carbonylmethyl)disulphide and 145 parts of calcium phosphate are mixed together with sufficient water to enable them to be extruded as granules. The moist granules are passed through a No. 12 sieve, and dried to constant weight at 55° C. The dried granules are passed through a No. 16 sieve, lubricated with magnesium stearate and compressed into tablets each containing 50, 100, 250 or 500 mg. of the active agent, which are suitable for oral administration.

Example 8

25 parts of the soluble form of bis(N-acetylhydrazino-N'-carbonylmethyl)disulphide are dissolved in sufficient water to give 100 parts by volume of solution. The solution is sterilized by filtration and enclosed aseptically in 1 ml. vials. The vialled solution is suitable for parenteral injection and each 1 ml. of the solution so prepared will deliver 50, 100, 250 or 500 mg. of the active agent which can be used for parenteral administration.

What we claim is:

A compound of the formula:

$$(SCH_2CONHNHCOCH_3)_2$$

References Cited by the Examiner

UNITED STATES PATENTS

| | | | |
|---|---|---|---|
| 2,746,906 | 5/1956 | Novak | 167—95 |
| 2,835,703 | 5/1958 | Caldwell | 260—561 |
| 2,932,667 | 4/1960 | Parke | 260—561 |
| 2,996,433 | 8/1961 | Hoppe | 167—95 |

FOREIGN PATENTS 782,420  9/1957  Great Britain.

WALTER A. MODANCE, *Primary Examiner.*

DUVAL T. McCUTCHEN, MORRIS O. WOLK,
*Examiners.*

P. SABATINE, R. L. PRICE, N. TROUSOF,
*Assistant Examiners.*